Oct. 8, 1963  F. L. McCLINTOCK  3,106,425
AUTOMOBILE LEG REST
Filed March 13, 1962  2 Sheets-Sheet 2
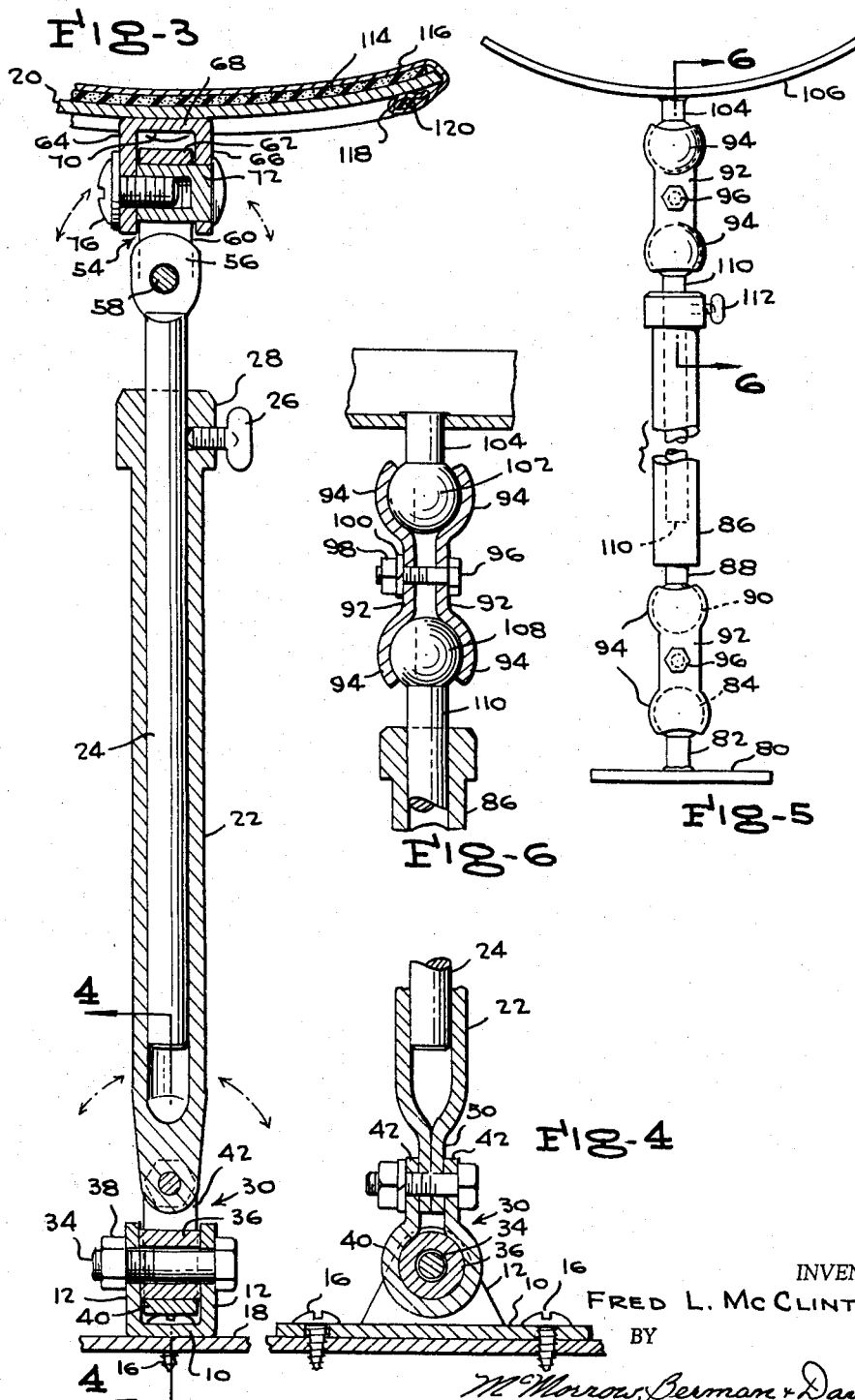
INVENTOR.
FRED L. McCLINTOCK
BY
McMorrow, Berman & Davidson
ATTORNEYS

United States Patent Office 3,106,425
Patented Oct. 8, 1963

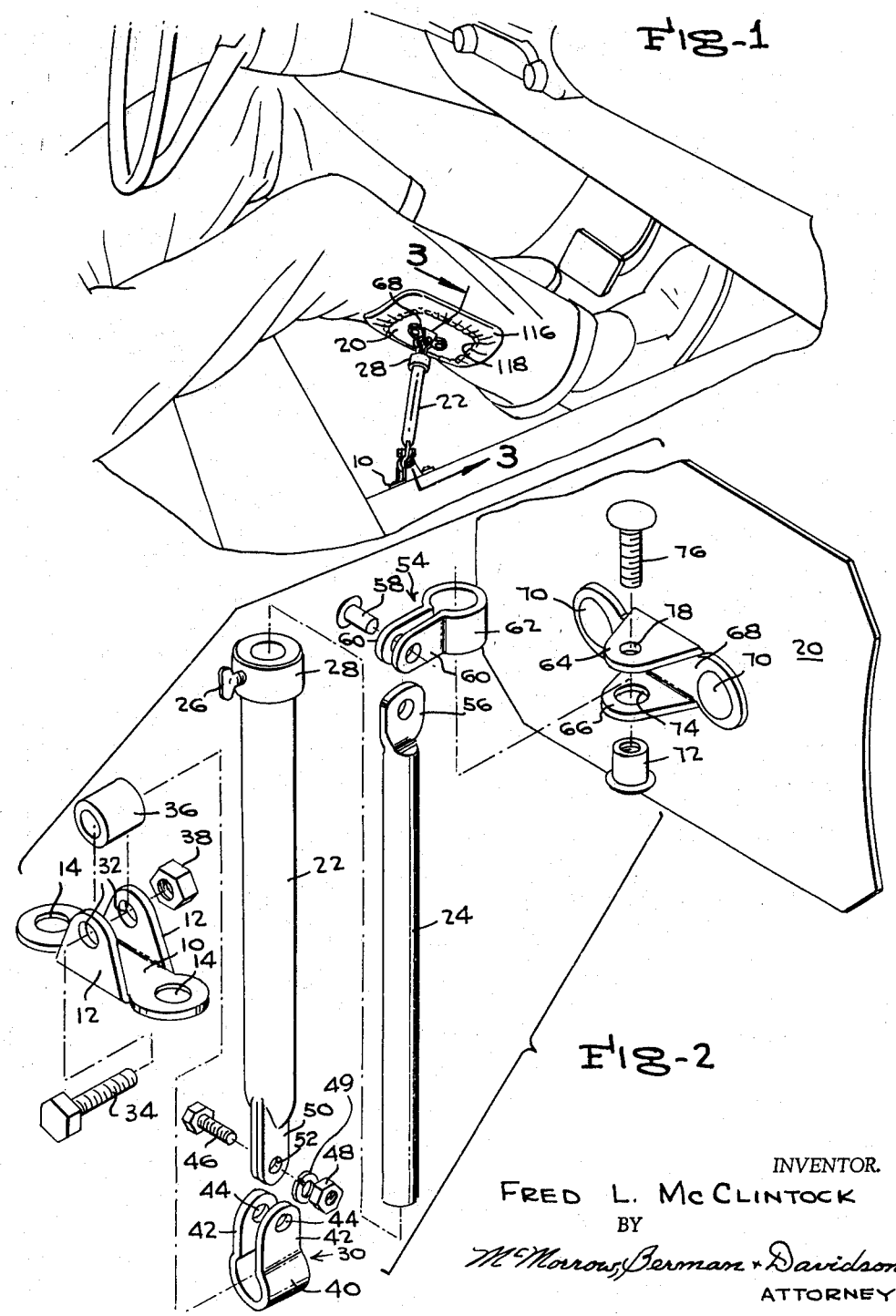

3,106,425
AUTOMOBILE LEG REST
Fred L. McClintock, R.R. 1, Box 149, Fortville, Ind.
Filed Mar. 13, 1962, Ser. No. 179,299
2 Claims. (Cl. 297—436)

This invention relates to a leg rest for automobile drivers, and is intended particularly to avoid fatigue and nervous tension incident to long periods of accelerator control by one foot of the driver. While devices of this general nature have been proposed heretofore, they have failed to find acceptance, due largely to certain inherent shortcomings, among which may be mentioned a lack of ready adjustability to different drivers, awkwardness of position, leading to driving hazards, and failure of the main function of providing proper and adequate relaxation.

It is, therefore, a general object of the present invention to overcome the enumerated shortcomings in satisfactory measure. More particularly, it is an object to provide a leg rest which is readily adjustable, universally, for proper positioning and to comport with drivers of different physique and proportions, and which is, at the same time unobtrusive in size and location, and may be moved out of the way when not in use.

A further difficulty with devices proposed heretofore has resided in their complexity, lack of facility in operation and adjustment, and also their undue cost, and it is a further object to provide a device which is more favorable in these respects.

These and other objects are attained by the present invention, a preferred form of which is described in the following specification, as illustrated in the drawings, in which:

FIGURE 1 is a perspective view of the device mounted in the driver portion of a vehicle, and showing a portion of the body of the driver, with one leg supported on the leg rest.

FIGURE 2 is an exploded view, in perspective, of the parts of the leg rest, arranged along a staggered, axial line.

FIGURE 3 is an axial sectional view through the leg rest, enlarged, taken along the line 3—3 of FIGURE 1.

FIGURE 4 is a sectional view of the lower part of the leg rest, at right angles to the position shown in FIGURE 3, as taken along the line 4—4 of FIGURE 3.

FIGURE 5 is an elevational view of a modified form of leg rest, foreshortened.

FIGURE 6 is an axial, sectional view through the upper part of the leg rest of FIGURE 5, taken on the line 6—6 of FIGURE 5.

Referring to the drawings by characters of reference, there is shown, in FIGURES 1-4, a leg rest comprising an elongate base plate 10, with a pair of intermediate, upstanding, side ears 12, provided with an opening 14 near each of its ends, to receive fastening screws 16, by means of which it is secured to the floor 18. As shown, this base plate is conveniently attached to the sloping side of the propeller shaft ridge, so as to leave the full, horizontal area of the floor in the driver compartment unobstructed.

The rest plate 20 for the driver's right leg, which may be a single piece of sheet metal, formed into a circularly cylindrical surface, is connected to the base plate through a telescopically adjustable standard comprising a lower tube 22, in which is slidably mounted a round rod 24, the position of length adjustment between the parts, being secured by a wing set screw 26, threadedly mounted, radially, in an enlarged upper portion 28 on tube 22.

The lower end of the tube 22 is universally connected to the base plate 10 through an intermediate, split, coupling strap 30, as follows: The ears 12 of the base plate 10 have axially aligned bores 32 adapted to receive a screw 34, on which is mounted, between the ears 12, a bushing sleeve 36, the screw being secured by a nut 38, and the sleeve being held against rotation by nut pressure. Rotatably mounted on the sleeve 36 is the cylindrical portion 40 of the split strap 30, the latter having a pair of terminal ears 42, arranged in parallelism, and having axially aligned bores 44, arranged at right angles to the axis of portion 40, and receiving a pivoting screw 46, equipped with a nut 48 and a lock washer 49. The ears 42 of the coupler are received on the standard in straddling relation to a flattened, lower end portion 50 on the tube 22, having a bore 52, receiving the screw 46.

It will be understood that whereas the lower coupling has been referred to as a universal, the pivotal connections are not ordinarily intended to be movable during use, but only for adjustment, the connections being tight enough to resist turning under ordinary forces. In the case of the upper connection, however, free pivotal movement may be desirable so that the rest plate 20 may shift with minor, intermittent shifting of the driver's leg. To this end, the upper coupling strap 54, which is structurally similar to lower strap 30, is pivoted to an upper flat portion 56 on the rod 24 by means of a rivet 58, passing through bores in ears 60 of the strap. The cylindrical part 62 of the strap is received between bracket ears 64, 66 extending from a plate 68, which is secured to rest plate 20 by rivets 70, the said part 62 being journaled on a cylindrical nut 72, received in an opening 74 in ear 66, and cooperating with a screw 76 received in a smaller bore 78 in ear 64. This construction leaves the rest plate free for swinging about two mutually perpendicular axes, but without undue play or sag. It is also possible to construct the upper universal with tightenable connections, for motion of adjustment only, as in the case of the lower universal.

With the construction shown, it will be seen that the range of adjustment is such that the telescoping standard may be forced down to a horizontal position when not needed, so that it is substantially out of the way, the rest plate being likewise folded. When the assistance of the rest plate is needed the standard is swung upward, by the application of a moderate force, and properly located to suit the needs of the driver. During use, the free universal connection at the top responds to slight, shifting movements of the leg of the driver, and thus avoids any feeling of confinement or restraint, while at the same time assuming most of the weight load of the leg and reducing the driver's burden to those manipulations which are confined to the region below the ankle joint, in contrast to the ordinary case, wherein the entire leg and much of the torso is continuously under strain. When a shift of the rest plate, bodily, to a different position is desirable, this is easily accomplished by a relatively light, applied load, sufficient to overcome the friction in the bottom universal.

An alternative form of universal connection, using ball and socket joints is illustrated in FIGURES 5 and 6, wherein the base plate 80 has an upstanding rod 82 with an upper, spherical head 84, a tube 86 of the telescoping standard has a lower, reduced end 88 with a spherical head 90 on its lower end, and the two spherical heads are connected by a pair of clamp plates 92, with bulbous ends 94 adapted to nest with the spherical heads, and secured in clamping relation thereto by means of a screw 96, with cooperating nut 98 and lock washer 100. The upper clamp member is identical with the lower one, and connects a ball head 102 on the lower end of a rod 104, welded in an opening in rest plate 106, to a ball head 108 on the top of a rod 110, slidable in tube 86, and secured in adjusted position by a wing screw 112. Free pivoting at the upper connection may be attained, if desired, by proper adjustment of the clamping pressure.

In order to provide additional comfort to the user, the rest plate may be provided with suitable cushioning means, and in FIGURE 3 this is shown as comprising an inner pad 114, of foam rubber or the like, secured in place on rest plate 20 by a cover 116 of flexible material having a hemmed border 118 enclosing an elastic band 120 which contracts the outer border of the cover into holding position on the underside of the rest plate.

While certain, preferred embodiments have been shown and described, various modifications will become apparent, in the light of this disclosure, and the invention should not, therefore, be deemed as limited, except insofar as shall appear from the spirit and scope of the appended claims.

What is claimed is:

1. A leg rest for vehicle drivers, adapted for mounting to a vehicle floor, the leg rest comprising:
    (a) a telescopically adjustable standard including a lower tube having a lower end and a rod having an upper end;
    (b) means to hold the tube and rod in adjusted position;
    (c) a rest plate;
    (d) a bracket on the rest plate;
    (e) a first universal coupling connecting the bracket to the upper end of the rod and permitting restricted swinging movement of the rest plate about at least two substantially perpendicular axes responsive to pressure from shifting of a driver's leg;
    (f) a base plate secured to the vehicle floor; and
    (g) a second universal coupling adjustably connecting the base plate to the lower end of the tube, and rigidly supporting the tube relative to the plate in adjusted position.

2. A leg rest as defined in claim 1, wherein said universal couplings each comprise:
    (a) a strap with a substantially cylindrical portion and a pair of mutually pivotal ears having axially aligned bores substantially perpendicular to the axis of said cylindrical portion; and
    (b) bushing means carried in the cylindrical portion and secured, respectively, to the bracket and the base plate.

References Cited in the file of this patent
UNITED STATES PATENTS

| | | |
|---|---|---|
| 408,823 | Carrick | Aug. 13, 1889 |
| 2,229,789 | Arndt et al. | Jan. 28, 1941 |
| 2,440,873 | Popp et al. | May 4, 1948 |
| 2,560,925 | Brown | July 17, 1951 |
| 2,701,605 | Belmont | Feb. 8, 1955 |
| 2,749,973 | Leasy | June 12, 1956 |
| 3,003,816 | Wilson | Oct. 10, 1961 |

FOREIGN PATENTS

| | | |
|---|---|---|
| 640,610 | Great Britain | July 26, 1950 |